Sept. 11, 1956 J. S. BEAM 2,762,138
ADJUSTMENT MECHANISM FOR TRACTOR-DRAWN DITCH DIGGING BLADE
Filed March 18, 1953 2 Sheets-Sheet 1
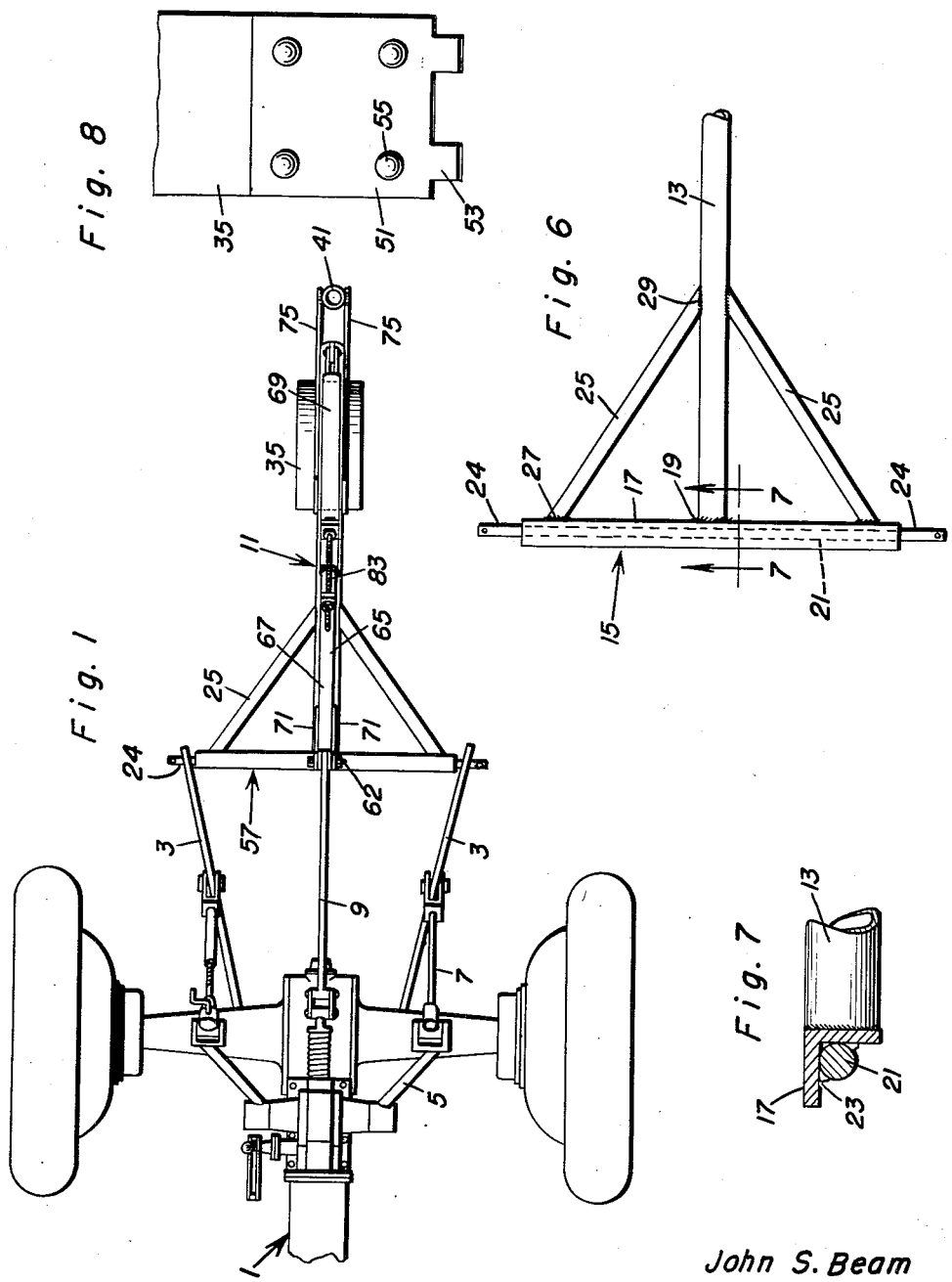
John S. Beam
INVENTOR.

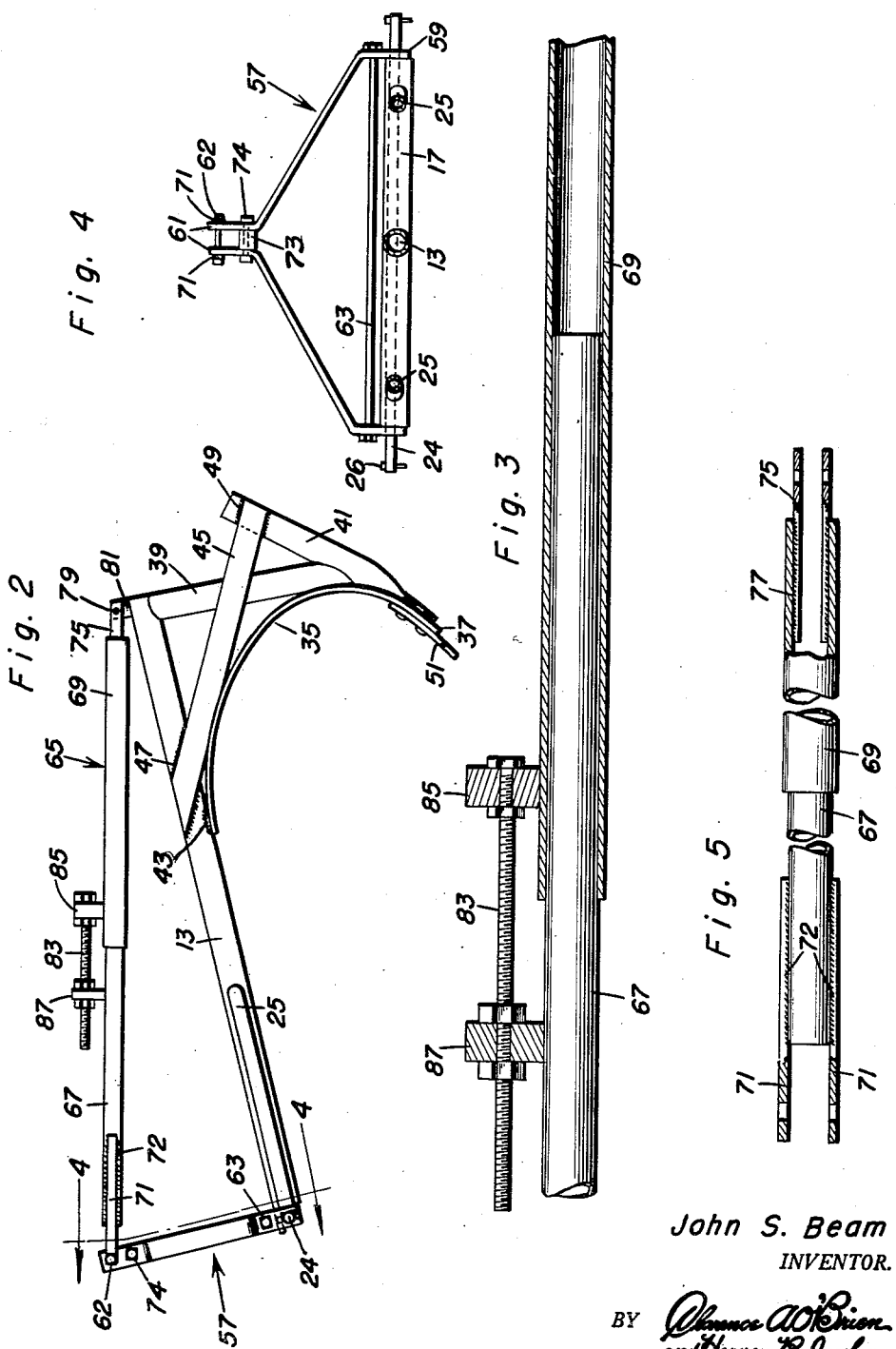

United States Patent Office 2,762,138
Patented Sept. 11, 1956

2,762,138
ADJUSTMENT MECHANISM FOR TRACTOR-DRAWN DITCH DIGGING BLADE

John S. Beam, Elverson, Pa.

Application March 18, 1953, Serial No. 343,090

1 Claim. (Cl. 37—98)

My invention relates to improvements in tractor-drawn ditch diggers for attachment to the power-lift of the conventional farm tractor.

The primary object of my invention is to provide a simply constructed, strong, light-weight ditch digger for easy attachment to the power-lift arms and the top compression link of the power-lift of a tractor for draft thereby and raising and lowering by the power-lift bodily for carrying or ditching purposes, all without subjecting the power-lift to excessive strain in the lifting and lowering operation.

Still another object is to provide a ditch digger for the above purpose especially designed for forming a ditch of rectangular shape in a course centered between the rear wheels of a tractor and for varying, independently of the power-lift, the depth of the ditch to be dug.

Still another object is to provide a ditch digger for attachment, as above specified, and which is especially adapted for digging in hard and stony ground, as well as soft ground.

Other and subordinate objects, within the purview of my invention, together with the precise nature of my improvements will be readily understood when the succeeding description and claim are read with reference to the drawings accompanying and forming part of this specification.

In said drawings:

Figure 1 is a fragmentary view in plan of my improved ditch digger, in the preferred embodiment thereof, attached to the power-lift of a tractor;

Figure 2 is an enlarged view in side elevation of the ditch digger detached;

Figure 3 is a further enlarged fragmentary view in longitudinal section of the telescopic tubular structure;

Figure 4 is a view in vertical transverse section taken on the line 4—4 of Figure 2;

Figure 5 is a fragmentary view partly broken away and shown in horizontal section of the telescopic tubular structure drawn to a smaller scale as compared with that of Figure 3;

Figure 6 is a fragmentary view in plan of the digger carrying beam, the draw-bar thereon and the braces between the draw-bar structure and the beam;

Figure 7 is an enlarged view in transverse section taken on the line 7—7 of Figure 6, and Figure 8 is a fragmentary enlarged view in front elevation of the digger blade and plate.

Referring to the drawings by numerals, in the embodiment of my invention illustrated therein, the numeral 1 designates a farm tractor, shown fragmentarily as sufficient for the present purposes, 3 designates the lower vertically swingable side, power-lift arms of the hydraulic power lift of the tractor and which are operated by crank arms 5 connected thereto by links 7, and 9 designates the upper vertically swingable compression link of the overload automatic control of such power-lifts, all as disclosed, for instance, in U. S. Letters Patent 2,118,180 to H. G. Ferguson to which attention is invited. As will be understood, the power-lift arms 3 and the link 9 function normally, as a parallel link motion, for raising and lowering purposes.

The ditch digger 11 of my invention comprises a digger carrying beam 13 extending rearwardly from the transverse center of a draw-bar structure 15. The digger carrying beam 13 is preferably tubular for lightness and strength. The draw-bar structure 15 preferably comprises an angle iron bar 17 to which the front end of the beam 13 is welded, as at 19, at the transverse center of the bar, and a rod 21 welded as at 23 (Figure 7), in said bar 17 and having its opposite ends 24 journaled in the rear ends of the lift arms 3 so that said beam 13 is vertically swingable on said lift arms 3. Diagonal brace rods 25 extend rearwardly from the bar 17 to said beam 13, as opposite sides of said beam, and are welded to said bar 17 and beam 13, as at 27, 29. Retaining pins 26 are provided in the ends 24 of the rod 21.

A vertically elongated rectangular and longitudinally curved digger blade 35 is rigidly mounted beneath the beam 13 in upright position with its concave side facing forwardly and its lower end 37 curved downwardly and forwardly. Mounting means for the blade 35 is provided comprising a tubular post 39 depending from the rear end of said beam 13 and having suitably fixed on its lower end a forwardly and downwardly inclined cross member 41 to the lower end of which the lower end 37 of the digger blade 35 is suitably secured with its upper end welded, as at 43, to the bottom of the beam 13. A pair of downwardly and rearwardly inclined brace bars 45 at opposite sides of said beam 13 and post 39 are welded to said beam and to the upper end of the cross member 41, as at 47, 49, and which brace both the post 39 and said member 41 against lateral movement.

A square digger plate 51 with depending digger teeth 53 is bolted to the lower end 37 of the digger blade 35, as at 55.

Means is embodied in the ditch digger 11 for swingably adjusting the beam 13 vertically on the lift arms 3 to vary the depth at which the digger blade 35 and plate 51 will dig, and thereby vary the depth of the ditch to be dug. This means comprises an upstanding yoke 57 of inverted V-shape having downturned lower ends 59 pivoted on the ends 24 of the rod 21, and upturned laterally spaced upper ends 61 between which the rear ends of the link 9 is pivoted by a pivotal bolt connection 62 so that said yoke is swingable on said ends 24 and link 9. A rod 63 rigidly connects the lower ends 59 of the yoke 57. A spacer 73 is bolted, as at 74, between said ends 61 below the pivoted connection 62.

A telescopic, tubular structure 65 extends from the upper ends 61 of the yoke 57 to the rear end of said beam 13 and comprises a front tube 67 slidably adjustable inwardly and outwardly of a rear tube 69. A pair of side bars 71 welded, as at 72, to the opposite sides of the front tube 67 straddle and are pivoted to the upper ends 61 of the yoke 57 by the pivotal connection 62 above the spacer 73, said side bars pivotally connecting said structure 65 to said yoke for vertical swinging thereon, while a similar pair of side bars 75 extending out of the rear end of the rear tube 69 and welded therein, as at 77, are pivoted by a bolt 79 to opposite sides of a nub 81 on the rear end of said beam 13 to pivotally connect said structure to the rear end of beam 13.

A screw feed shaft 83 suitably journaled, against endwise movement, in a lug 85 on the rear tube 69, and threaded through a similar lug 87 on the front tube 67 provides for screw feed adjustment of the front tube 67 to extend or shorten the telescopic structure 65.

Referring now to the use and operation of my invention. The ditch digger 11 is attached to the lift arms 3, by spreading the same apart so that the ends 24 of rod 21 may be inserted in the usual openings, not shown, in said bars 3, and by bolting the upper ends 61 of the yoke 57 to the link 9 by the pivotal connection 62. When thus attached, the ditch digger 11 may be raised or lowered bodily by the side lift arms 3 for carrying or ditching purposes, as required. In ditching the digger blade 35 and plate 51 will form a ditch of rectangular shape. By virtue of the curvature of said blade, the same will easily dip up and bring to the surface stones and the like thereby adapting it for ditching in hard stony ground, as well as in soft ground. By extending or shortening the telescopic structure 65, in the manner described, the beam 13 may be swung upwardly or downwardly on the lift arms 3 so that the depth at which the blade 35 and plate 51 will dig may be varied independently of operation of the power-lift, to vary the pitch of the digger blade 35, all to suit operating requirements. Obviously, this may be accomplished prior to lowering of the ditch digger 11 into ditching position by the power-lift. The yoke 57 provides for operatively connecting the telescopic structure 69 to the beam 13 while at the same time the ditch digger 11 is connected to the compression link 9 of the overload automatic control of the power-lift so that under overload on the power-lift in digging a ditch with the ditch digger, said automatic control will operate in the usual manner, as described in the aforesaid patent, and whereby the ditch digger will be raised automatically out of the ground.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

What is claimed as new is as follows:

A ditch digger for attachment to the side lift arms and upper compression link of the hydraulic power lift of a tractor comprising a digger carrying beam having a front end provided with a transverse drawbar pivoted at its ends on said side lift arms for vertical swinging of said beam on said side arms, a digger blade, means mounting said blade on the beam beneath the same, a yoke pivoted on the ends of the drawbar and rising from said ends, a pair of aligned telescopic tubes above said beam, one pivoted to the yoke and the other pivoted to the beam, said pair of tubes being adapted to be extended and retracted relative to each other to thereby swingably adjust said beam vertically for varying the working angle of said blade, a pivotal connection between said yoke and link whereby said power lift will raise and lower the ditch digger bodily, a laterally extending internally threaded lug rigidly attached to each of said tubes, and a screw feed shaft extending through said lugs parallel with said tubes and above the same and operative in said lugs to extend and retract said telescopic tubes relative to each other.

References Cited in the file of this patent
UNITED STATES PATENTS

| | | |
|---|---|---|
| 26,289 | Peek | Nov. 29, 1859 |
| 385,275 | Leigh | June 26, 1888 |
| 1,145,212 | Plummer | July 6, 1915 |
| 2,386,192 | Brimhall | Oct. 9, 1945 |
| 2,440,550 | Martin | Apr. 27, 1948 |
| 2,518,105 | Werth | Aug. 8, 1950 |
| 2,560,711 | Arps | July 17, 1951 |
| 2,564,355 | Danuser | Aug. 14, 1951 |